United States Patent [19]

Ellenberger

[11] 4,333,229
[45] Jun. 8, 1982

[54] METHOD OF MANUFACTURING THIN FILM MAGNETIC HEAD/SLIDER COMBINATION

[75] Inventor: Michael L. Ellenberger, Santa Cruz, Calif.

[73] Assignee: Memorex Corporation, Santa Clara, Calif.

[21] Appl. No.: 170,479

[22] Filed: Jul. 21, 1980

[51] Int. Cl.³ .............................................. G11B 5/42
[52] U.S. Cl. ................................................... 29/603
[58] Field of Search ......................... 29/603; 360/103

[56] References Cited

U.S. PATENT DOCUMENTS

| | | |
|---|---|---|
| 3,528,067 | 9/1970 | Linsley et al. |
| 3,678,482 | 7/1972 | Billawala |
| 3,823,416 | 7/1974 | Warner |
| 3,855,625 | 12/1974 | Garnier et al. |
| 3,956,770 | 5/1976 | McWhinnie et al. |
| 4,081,846 | 3/1978 | Roscamp et al. |
| 4,130,847 | 12/1978 | Head et al. |
| 4,226,018 | 10/1980 | Nakanishi et al. ..................... 29/603 |
| 4,246,695 | 1/1981 | Tsui ........................................ 29/603 |

FOREIGN PATENT DOCUMENTS 54-114223  9/1979  Japan ..................................... 29/603

OTHER PUBLICATIONS

IBM Technical Disclosure Bulletin, vol. 21, No. 12, May 1979, p. 5004, "Thin Film Head Assembly", Jones et al.

*Primary Examiner*—Lowell A. Larson
*Attorney, Agent, or Firm*—Limbach, Limbach & Sutton

[57] ABSTRACT

A method of manufacturing thin-film magnetic transducers in which the transducers are deposited onto a substrate member adjacent a finished and lapped surface in a manner such that no further lapping of the slider rail adjacent the transducer is required during manufacture. The method includes forming recesses on the substrate member to define slider rails and then forming air bearing surfaces on each such rail.

7 Claims, 19 Drawing Figures

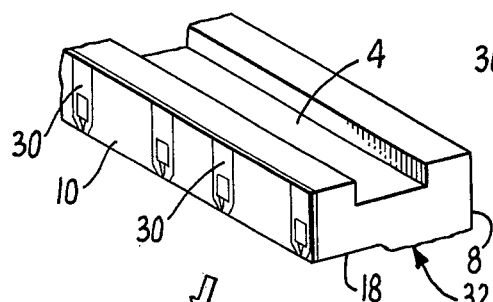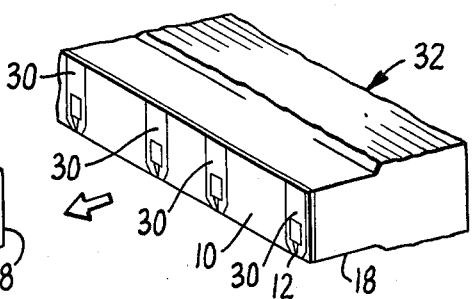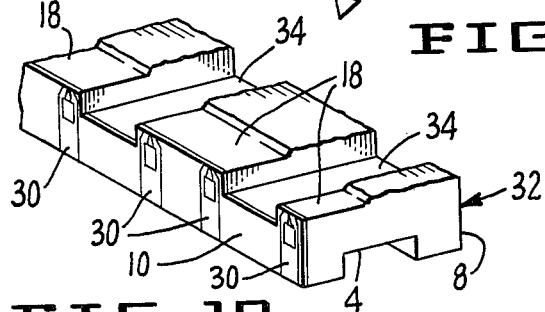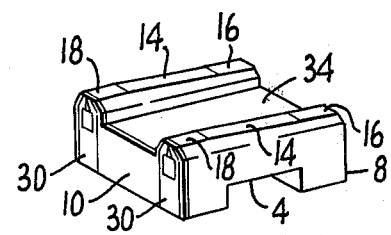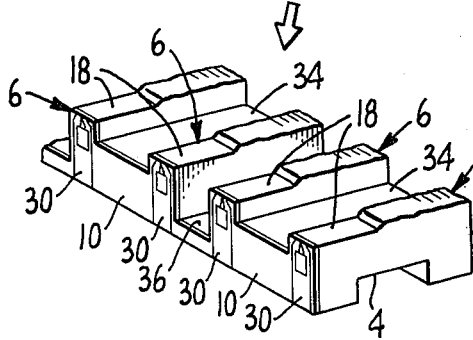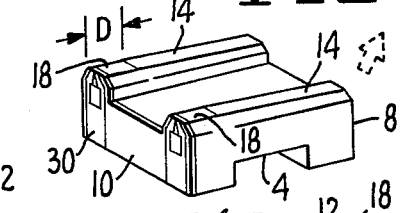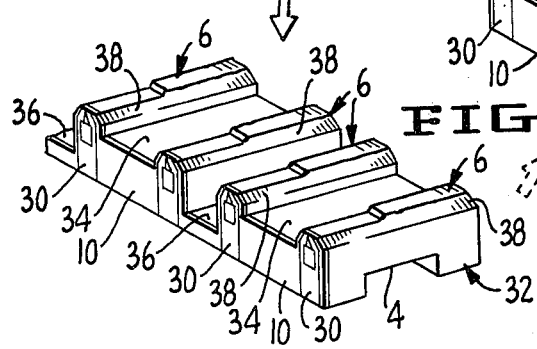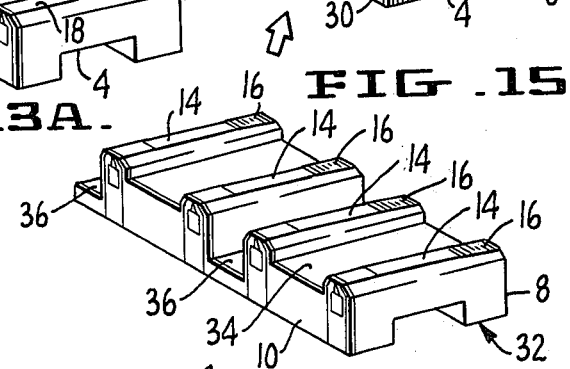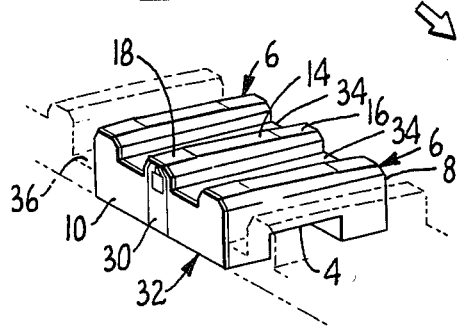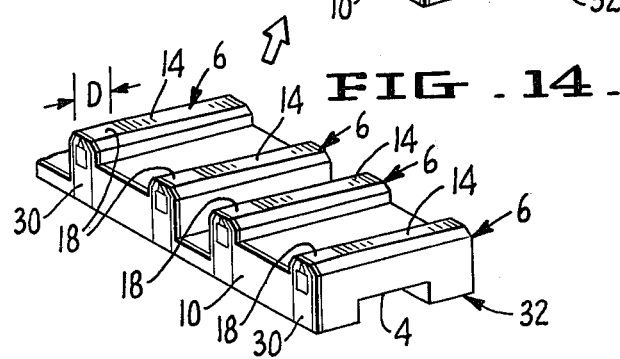

METHOD OF MANUFACTURING THIN FILM MAGNETIC HEAD/SLIDER COMBINATION

BACKGROUND OF THE INVENTION

This invention relates to a method of manufacturing flying magnetic transducer assemblies, and more particularly to such transducer assemblies comprising a thin-film transducer deposited upon a substrate. More specifically, the invention relates to such a transducer which starts and stops in contact with the magnetic medium and is supported above that medium on an air bearing during operation.

Magnetic recording systems utilizing transducer heads flying on an air bearing film over rotating magnetic recording discs are well known in the art. One commonly used type is illustrated and described in some detail in U.S. Pat. No. 3,855,625 to Garnier et al. Such a structure is formed with a pair of spaced apart air bearing rails with a magnetic transducer at the rear of each of such rails. These heads are resiliently loaded toward the surface of the magnetic medium, generally a rotating disc, to a predetermined degree to cause them to fly very close, on the order of 50 microinches, above that surface.

To achieve ever smaller and more precise recording transducers, recent years have seen the development of thin-film transducers which are deposited onto the slider by various photolithographic and etching techniques well known in the semiconductor art. This thin-film transducer replaces the ferrite core transducer which has been used in the past. In conventional manufacturing techniques the thin-film transducer, having a magnetic gap or throat height which is considerably larger than desired, is applied to the substrate material at the rear of the air bearing rails. Then, the slider substrate material is lapped to achieve the desired configuration and dimensions for the air bearing rails. At this same time, the rear portion of the rails is lapped to achieve a desired throat height on the transducer. While this manufacturing technique is relatively straightforward, it has resulted in a very low yield of usable heads. This low yield is due largely to the effects of the abrasive lapping of the rails adjacent the thin-film transducer throat causing delamination and chipping of the transducer throat away from the slider, thus rendering it unusable.

The problem is considerably more complicated than with the conventional magnetic core transducers, since those conventional heads required throat height tolerances on the order of ±200 microinches. Thin-film heads desired for higher performance applications may have throat height tolerances ten times tighter, on the order of ±20 microinches. With this required accuracy in precision, standard manufacturing techniques have given a yield of nearly zero usable heads.

The manufacturing tolerances for these devices are quite important, since the read and write characteristics of thin-film recording transducers are very much dependent upon throat height. The throat height tolerance limits define the outside limits at which the transducers will read and write acceptably in a high performance disc drive. In other words, a small range of throat heights produces a large range of performance characteristics. Obviously such differences in performance from head to head must be corrected and compensated for in the electronics and other portions of the disc drive system to achieve consistent operation.

One characteristic of thin-film recording transducers is that of improving read and write performance with decreasing throat height. However, due to the difficulty in lapping to a predetermined dimension with micro-inch tolerances, current manufacturing processes have prevented thin-film heads from realizing their full operational potential. As noted above, current manufacturing techniques dictate lapping the thin-film transducer at the time of lapping the slider to form the air bearing rails with the desired flatness and surface finish. Since this lapping conventionally extends all the way to the rear of the rails, the operation also changes and controls the thin-film transducer throat height. Furthermore, this lapping has tended to delaminate and lift the transducer from the slider, frequently destroying it and reducing the yield of the process.

Another problem currently experienced by these conventional heads, referred to as "taper-flat air bearing heads" is that the thin-film transducer at the rear of the air bearing rail contacts the disc surface whenever the head contacts the disc, since the transducer is contiguous with the end of the air bearing rail. Such contact with the disc surface also causes delamination and lifting of the transducer from the slider, further damaging and compromising the read/write capability of the head.

SUMMARY OF THE INVENTION

In view of the disadvantages of the prior art transducers, and particularly prior art thin-film transducers, it is an object of the present invention to provide a method of manufacturing thin-film transducers which eliminates the difficulty of lapping the head to a transducer throat height dimension.

It is another object of the invention to provide such a method which reduces performance characteristic differences among various heads. It is yet another object of this invention to provide such a manufacturing method which permits processing of a large number of heads simultaneously. It is still another object of this invention to provide a slider/head combination in which the thin-film transducer remains out of contact with the surface of the recording medium at all times.

To achieve these and other objects which will become apparent below, there is provided a method of manufacturing a thin-film magnetic recording and playback head/slider combination having an air bearing structure which includes the steps of forming at least two intersecting elongated surfaces on an extended member of substrate material with the first surface being lapped flat and the second surface being flat and defined as the rear surface of the head/slider combination, depositing a plurality of side-by-side thin-film transducers onto the member rear surface and positioned relative to the first surface in the predetermined relationship desired for the finished head/slider combination, forming recesses in the first surface between such transducers, the recesses so formed intersecting both the rear surface and a third surface of the member defined as the front surface thereof, whereby are formed a plurality of rails extending between the member front and rear surfaces and including the first surfaces, at least some of which have a transducer at the rear end thereof, and forming on each such rail an air bearing surface and taper extending longitudinally of the rail between the first surface and a forward surface, the air bearing surface intersecting the first surface and being inclined away from that first surface and being formed by abrading the rail at an angle to the first surface until the intersection of the air bearing surface and the first surface is a predetermined distance from the member rear surface, and the taper extends forward from that air bearing surface to the member forward surface.

BRIEF DESCRIPTION OF THE DRAWINGS

The method of this invention will be described with respect to several preferred embodiments illustrated in the drawings in which:

FIG. 8 is a perspective view of the substrate material, formed by slicing the wafer of FIGS. 4 through 7 vertically within each of the slots;

FIG. 9 is a perspective view of the bar member of FIG. 8 after machining a mounting slot longitudinally of the bar in the top surface thereof;

FIG. 10 is a perspective view of the bar of FIG. 8, inverted, illustrating the recesses machined between adjacent transducers;

FIG. 11 illustrates the member of FIG. 10 with additional recesses machined between adjacent pairs of transducers, to define rails to be machined for air bearing surfaces;

FIG. 12 illustrates the substrate member of FIG. 11 after rough machining of bevels onto the air bearing rails;

FIG. 13 illustrates the member of FIG. 12 after initial machining of the air bearing surface onto the rail;

FIG. 14 illustrates the member of FIG. 13 after lapping the air bearing surface to the proper dimension and lapping of the taper portion between the air bearing surface and the leading edge of the member;

FIG. 15 illustrates a single, two-rail head/slider combination formed by dividing the member of FIG. 14 between adjacent two-rail head/slider combinations to form individual heads;

FIGS. 13A, 14A and 15A illustrate steps corresponding to FIGS. 13, 14 and 15 but where the member of FIG. 12 is divided into individual two-rail head/slider combinations prior to lapping of the air bearing and taper surfaces; and FIG. 16 illustrates a member corresponding generally to that of FIG. 14 which has been machined to form three-rail head/slider units with a thin-film transducer only on the center rail.

DESCRIPTION OF PREFERRED EMBODIMENTS

While the method of this invention is suitable for producing head/slider combinations having any desired number of air bearing rails and transducers, for convenience it will be described in detail with respect to a method of manufacturing head/slider combinations of the common two-rail configuration. Of course it is to be understood that these same steps may be modified in a manner apparent to those skilled in the art for use in manufacturing head/slider combinations having other numbers of rails and transducers.

Figure 1:
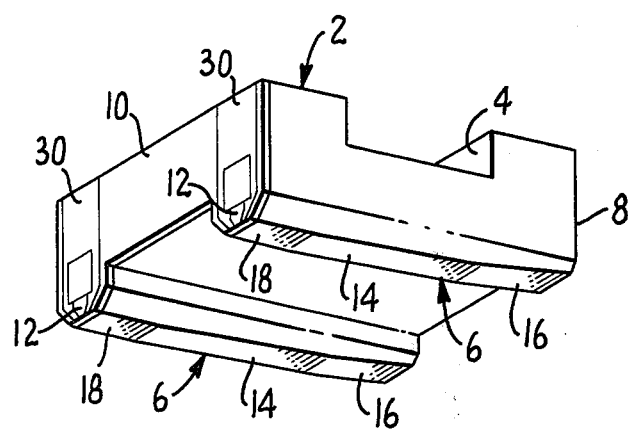
FIG. 1 is a perspective view of a two-rail head/slider combination manufactured according to the present invention.
Figure 2:
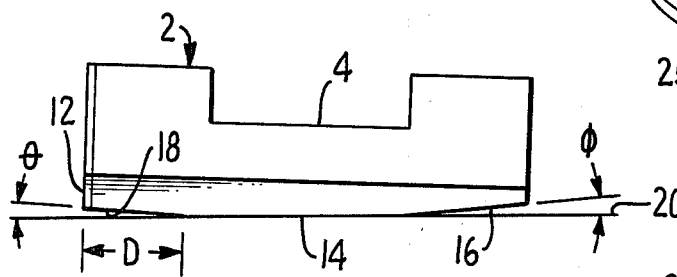
FIG. 2 is a side elevational view of the slider of FIG. 1 shown resting upon the surface of recording media.
Figure 3:
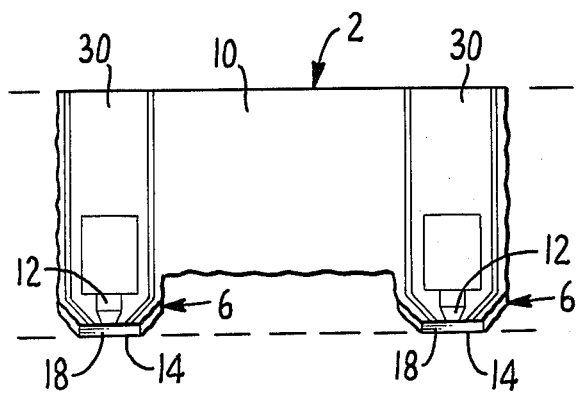
FIG. 3 is a rear elevational view of the head/slider combination of FIGS. 1 and 2, showing the thin-film transducer.

FIGS. 1 through 3 illustrate a two-rail head/slider combination manufactured according to the present invention. This combination includes the slider body 2, of a suitable material, such as ferrite, ceramic, glass or the like, and having an appropriate and conventional mounting slot 4 machined in the upper surface thereof. A recess on the underside of the slider body defines a pair of air bearing rails generally indicated by reference numeral 6. These rails 6 extend from the front surface 8 of the slider body 2 to the rear surface 10 thereof. Deposited on the rear surface 10 at the rear of each of the two-rails 6 is a thin-film transducer 30, which may be of any known configuration, since this invention is not limited to a specific type of thin-film transducer.

Each rail 6 of the slider includes an air bearing surface 14 and a front taper 16, defining the conventional configuration of a "taper-flat air bearing". Between the rearmost portion of the air bearing surface 14 and the transducer 30 on the rear surface of each rail 6 is another surface 18, which may be referred to as a reference surface, or first surface, for purposes to be described below.

As illustrated in FIG. 2, the air bearing surface 14 may be inclined slightly with respect to the base of the slot 4. Additionally, taper 16 is inclined a suitable angle $\phi$ away from the air bearing surface 14, and the reference surface 18 is inclined a small angle $\theta$ away from air bearing surface 14. FIG. 2 schematically illustrates the head/slider combination of the invention resting on a surface 20, such as the surface of a magnetic recording disc at rest. FIG. 3 is a rear view of the structure of FIG. 2. With the reference surface 18 inclined away from the air bearing surface 14, which contacts the media surface 20 at rest, the recording transducer is protected from abrasive contact with that media surface, in generally the same manner as described in the co-pending patent application entitled CONTOURED MAGNETIC RECORDING HEAD/SLIDER ASSEMBLY by John C. Scott and Raymond Herrera, which is assigned to the assignee of the present invention.

Figure 4:
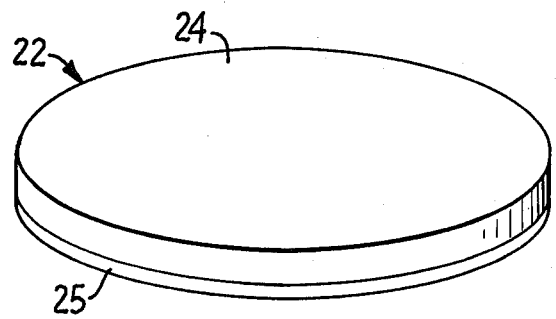
FIG. 4 illustrates a wafer of substrate material to be used in the manufacture of the head/slider combinations of the present invention.

In FIGS. 4 through 15 is illustrated a preferred method for manufacturing a plurality of the head/slider combinations of FIGS. 1 through 3 in a batch processing arrangement. FIG. 4 illustrates a wafer 22, which may be of any suitable and well known slider material, such as ferrite or the like, the disc being any convenient size, for example 4 inches or so in diameter. As a first manufacturing step, the broad surface 24 of this wafer is made substantially flat and smooth, as by lapping. For convenience in handling the wafer 22 is mounted to a suitable backing support 25.

Figure 5:
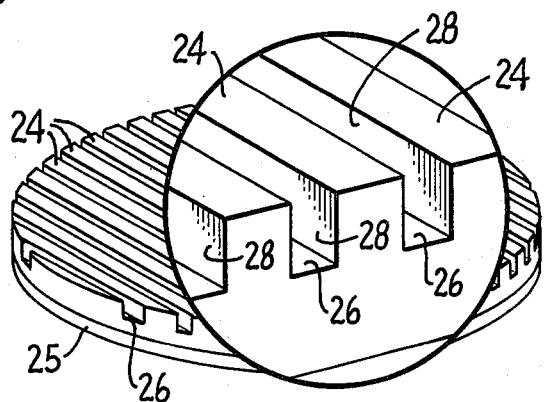
FIG. 5 is a perspective view of the substrate member of FIG. 3, including a magnified portion thereof illustrating the parallel, spaced-apart slots machined thereinto.
Figure 6:
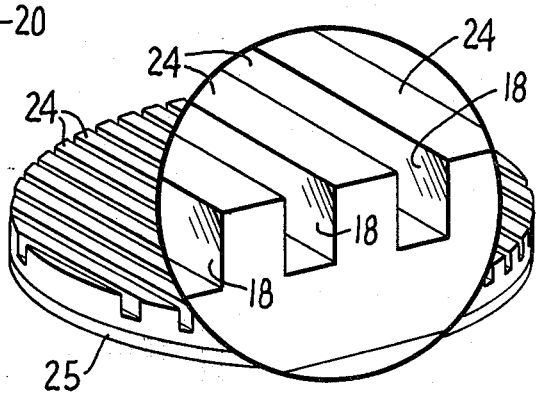
FIG. 6 is a perspective view of the substrate member of FIG. 4 after lapping at least one vertical surface of each of the slots.

The next processing step, illustrated in FIG. 5, involves forming a plurality of parallel, spaced-apart slots 26 in that surface 24. The parallel opposed sides 28 of each of the slots 26 are machined as smooth as possible.

In the following processing step at least one of each mutually opposed pair of parallel slot sides 28 is then lapped to a highly polished and very smooth finish, suitably on the order of a 2 microinch finish. This lapping thus creates from that surface 28 the reference surface 18, noted with respect to FIGS. 1 through 3. Preferably, in this lapping process each of the reference surfaces, 18 is accurately positioned to be a predetermined distance away from each of the other parallel reference surfaces, or first surfaces, 18. By this lapping process, the reference surface 18 is brought to its final lapped condition for use in the finished head/slider combination.

Figure 7:
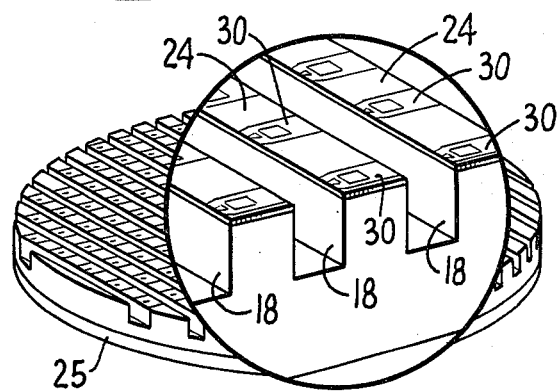
FIG. 7 is a perspective view of the slotted and lapped member of FIG. 6 after a pattern of thin-film transducers has been deposited thereonto.

After the reference surface 18 is lapped, the next process step, illustrated in FIG. 7, involves the depositing of a plurality of side-by-side thin-film transducers 30 onto the substrate material. These transducers, which may be of any of a number of known thin-film transducer configurations, are applied by conventional and well known photolithographic techniques well known in the semiconductor industry. As shown in FIG. 4, these thin-film transducers 30 are deposited onto the surface 24 of the wafer, this surface 24 ultimately becoming the rear surface of the head/slider combination in a manner to be shown below. The photodeposition technique used for placing the thin-film transducers onto the substrate surface provides for positioning the transducers exceedingly accurately with respect to the lapped reference surface 18, which intersects the substrate surface 24. The transducers can be deposited with a carefully controlled, predetermined relationship between the transducer throat height and the reference surface 18, this being the final throat height of the head/slider combination when manufacturing is completed. Thus, no further lapping or processing of the slider is required to establish the desired height of the throat 12 of the gap in relation to the bottom of the slider. By the elimination of further processing of the bottom surface of the slider adjacent the thin-film transducer and its throat 12, the delamination and other damage caused to the deposited thin-film transducer 30 in conventional manufacturing techniques is eliminated.

The subsequent processing steps in forming the head/slider combination are illustrated in FIGS. 8 through 15. After the thin-film transducers 30 have been deposited on the slotted wafer as shown in FIG. 7, in this preferred embodiment the wafer is then divided into a plurality of extended substrate members by severing the wafer, as by sawing it, within the slots 26. This severing thus forms a plurality of extended bar-like members 32, such as illustrated in FIG. 8. Each such member thus includes a plurality of the transducers 30 in side-by-side relationship along the extended rear surface 10 of the member.

Obviously, if desired, the wafer 24 could be divided into a plurality of such members 32 prior to depositing the transducers 30 thereupon, if it were desired only to deposit a single row of such transducers at a time. Equally obviously, but less advantageously, the extended substrate member 32 could be obtained by sawing, grinding and lapping other substrate configurations to form the desired bar-like arrangement 32 upon which the thin-film transducers may be deposited.

After the member 32 has been formed as noted above, one surface of it, which will become the upper surface, is machined to a finished condition, as shown in FIG. 9. This machining suitably involves the formation of a slot 4, which may be used in the well known manner for ultimately mounting the transducer to a flexure arm. This slot, as shown in FIG. 9, is the same as that described above with respect to FIGS. 1 and 2. Additionally, a third surface 8, which will become the forward surface of the finished transducer conveniently may also be machined at this time.

In FIGS. 10 and 11 are illustrated the next processing steps, in which recesses 34 and 36 are formed between adjacent transducers 30. These recesses 34 and 36 are formed in reference surface 18 and extend transversely of the member 32 intersecting both the rear surface 10 and the forward surface 8, extending not only through reference surface 18 but also through the rough-sawn surface between reference surface 18 and the forward edge 8 of the member 32. By the formation of these recesses 34 and 36 are formed a plurality of rails 6 extending between the member front and rear surfaces and including the first, or reference, surface 18.

Subsequent to the rough forming of the rails 6 in the steps of FIGS. 10 and 11, a desired bevel 38 may be machined longitudinally of the rails between the side and bottom surfaces thereof. At this point the head/slider combination may be finished through any of several desirable sequences of operation, two of which are shown in FIGS. 13 through 15 and FIGS. 13A through 15A.

In the next step, illustrated in FIG. 13, the air bearing surface 14 is lapped onto each of the rails 6 of the member 32. Unlike conventional processing techniques, this air bearing surface may be lapped, not parallel to the base of mounting slot 4, but at a slight angle thereto. As illustrated most clearly in FIG. 2, the reference surface 18 suitably may be substantially parallel to the base of mounting slot 4. Then the air bearing surface 14 is formed by lapping the rails 6 inclined at a small angle $\theta$ away from the reference surface 18. Suitably, the angle $\theta$ at which the air bearing surface is lapped or abraded may be on the order of $\frac{1}{2}°$, or 30'. As an important advantage of this process, the formation of this air bearing surface 14 involves no lapping of this reference surface 18 at any time after the thin-film transducers 30 are deposited thereonto. By lapping the air bearing surface 14 at the angle $\theta$ to the reference surface 18, the proper amount of lapping may be determined by the length D of the reference surface between the rear surface 10 of the member 32 and its intersection with the air bearing surface 14. This makes measurement of the desired amount of lapping of the air bearing surface very simple, and also avoids any contact between the abrasive lapping surface and the reference surface and its transducer 30. For transducers having a nominal front-to-back length of about 0.25 inches, a suitable dimension D is on the order of 0.025 inches.

After the air bearing surface 14 is formed in the step illustrated in FIG. 13, the front taper on the slider rail may then be formed, as illustrated in FIG. 14. This taper, as shown in FIG. 2, is inclined at another small angle $\phi$ away from the air bearing surface 14. This taper 16 may suitably be inclined slightly less than one degree (e.g. about 58') from the air bearing surface 14, and may suitably extend about 0.030 inches back from the forward surface 8 of the member 32.

As a final step, illustrated in FIG. 15, individual two-rail slider/head combinations may be formed from the member 32 by cutting away the material at the base of each of the recesses 36, thus forming the finished head/slider combination shown in FIG. 15, which is the same as that illustrated in FIGS. 1 through 3.

An alternate series of finishing steps is illustrated in FIGS. 13A, 14A and 15A. These steps are substantially identical to those of FIGS. 13 through 15, except that the cutting apart of the individual, two-rail head/slider combinations is done immediately after the step of FIG. 12. Thus, in FIGS. 13A, 14A and 15A, the air bearing surfaces 14 and tapers 16 are lapped on individual heads instead of being done en banc. The completed head illustrated in FIG. 15A is suitably substantially identical in all respects to that of FIGS. 15 and 1 through 3.

With the manufacturing process described above, it should be apparent that it is equally easy to fabricate heads having more than two rails, such as the well known "trimaran" head having two air bearing rails and one central rail with a transducer. With the process of this invention, the formation of such other configurations simply involves convenient variations of the rail forming and machining techniques of FIGS. 10 through 12. A technique for forming three-rail heads, with only each center rail having a transducer, is illustrated in FIG. 16, in which that figure represents the manufacturing steps corresponding to that of FIG. 14 described above. By similar techniques, heads having any number of rails and transducers can be formed through the use of the process of this invention, particularly since an entire member 32 could be utilized as a single gang head arrangement.

While the foregoing describes a particularly preferred embodiment of the manufacturing method of this invention, it should be apparent that numerous variations and modifications, all within the scope of the invention, will readily occur to those skilled in the art. Accordingly, the scope of this invention is to be limited, not by the foregoing description, but solely by the claims appended hereto.

I claim:

1. A method of manufacturing a thin film magnetic recording and playback head/slider combination having an air bearing structure, comprising the steps of on an extended member of substrate material, forming at least two intersecting elongated surfaces, a first said surface being flat, and a second said surface being flat and defined as the rear surface of said head/slider combination;

depositing a plurality of side-by-side thin film transducers onto said member rear surface and positioned relative to said first surface in the predetermined relationship desired for the finished head/slider combination;

forming recesses in said first surface between said transducers, the recesses so formed intersecting both said rear surface and a third surface of said member defined as the front surface thereof, whereby are formed a plurality of rails extending between the member front and rear surfaces and including said first surfaces, at least some of which rails have a transducer at the rear end thereof; and forming on each said rail an air bearing surface and taper extending longitudinally of said rail between said first surface and said forward surface, said air bearing surface intersecting said first surface and being inclined away from said first surface and being formed by abrading said rail at an angle to said first surface until said intersection of said air bearing surface and said first surface is a predetermined distance from said member rear surface, and said taper extending from said air bearing surface to said member forward surface.

2. The method of claim 1 wherein said substrate material is in the form of a flat wafer with one of the flat surfaces thereof being said second surface and having a plurality of parallel, spaced-apart slots formed therein to define a plurality of said first surfaces, and said method further comprises severing said wafer within said slots to form a plurality of said extended members prior to said depositing of said transducers.

3. The method of claim 1 further comprising dividing said member into a plurality of head/slider units by severing said member in a direction parallel to said rails between preselected said rails.

4. The method of claim 3 wherein said member is divided into a plurality of head/slider units each having at least two said rails.

5. The method of claim 4 wherein said member is divided such that each said head/slider unit has two said rails and each said rail has a transducer on the rear surface thereof.

6. The method of claim 3 wherein said member is so severed prior to said formation of said air bearing surfaces.

7. The method of claim 3 wherein said member is so severed after said formation of said air bearing surfaces.

* * * * *